United States Patent
Haggerty et al.

(10) Patent No.: US 8,252,090 B2
(45) Date of Patent: Aug. 28, 2012

(54) PROCESS AND APPARATUS FOR PROVIDING AN INERT GAS TO A LARGE VOLUME ATMOSPHERE

(75) Inventors: Sean Haggerty, North Haven, CT (US); Guy Hatch, Vernon, CT (US); Sanh Phan, Southington, CT (US)

(73) Assignee: On Site Gas Systems, Inc., Newington, CT (US)

( * ) Notice: Subject to any disclaimer, the term of this patent is extended or adjusted under 35 U.S.C. 154(b) by 406 days.

(21) Appl. No.: 12/565,114

(22) Filed: Sep. 23, 2009

(65) Prior Publication Data

US 2010/0077921 A1    Apr. 1, 2010

Related U.S. Application Data

(60) Provisional application No. 61/099,974, filed on Sep. 25, 2008.

(51) Int. Cl.
*B01D 53/047* (2006.01)
(52) U.S. Cl. .......................... 95/138; 96/121
(58) Field of Classification Search .............. 96/121, 96/130; 95/96, 127, 138
See application file for complete search history.

(56) References Cited

U.S. PATENT DOCUMENTS

| | | | | |
|---|---|---|---|---|
| 5,127,233 | A * | 7/1992 | Coffield | 62/78 |
| 5,308,382 | A * | 5/1994 | Prasad | 95/12 |
| 5,649,995 | A * | 7/1997 | Gast, Jr. | 95/12 |
| 5,814,130 | A * | 9/1998 | Lemcoff et al. | 95/96 |
| 6,235,087 | B1 * | 5/2001 | Chevalier et al. | 96/9 |
| 6,314,754 | B1 * | 11/2001 | Kotliar | 62/640 |
| 6,585,192 | B2 * | 7/2003 | Beers | 244/135 R |
| 6,604,558 | B2 * | 8/2003 | Sauer | 141/98 |
| 7,442,230 | B2 * | 10/2008 | Snow, Jr. | 95/1 |
| 7,588,612 | B2 * | 9/2009 | Marwitz et al. | 55/356 |

\* cited by examiner

*Primary Examiner* — Frank Lawrence, Jr.
(74) *Attorney, Agent, or Firm* — Michaud-Kinney Group LLP

(57) ABSTRACT

A system and method is presented for reducing a concentration of ambient air used in a feed stream to form an inerting gas in a pressure swing adsorption system. The method includes introducing ambient air into a pressure swing adsorption system to form an inerting gas, introducing the inerting gas to a large volume of atmosphere, thereby inerting at least a portion of the large volume of atmosphere to form an inerted atmosphere, and removing a portion of the inerted atmosphere and introducing the portion of inerted atmosphere to the pressure swing adsorption system to form the inerting gas, thereby reducing an amount of ambient air utilized to form the inerting gas in the pressure swing adsorption system.

25 Claims, 4 Drawing Sheets

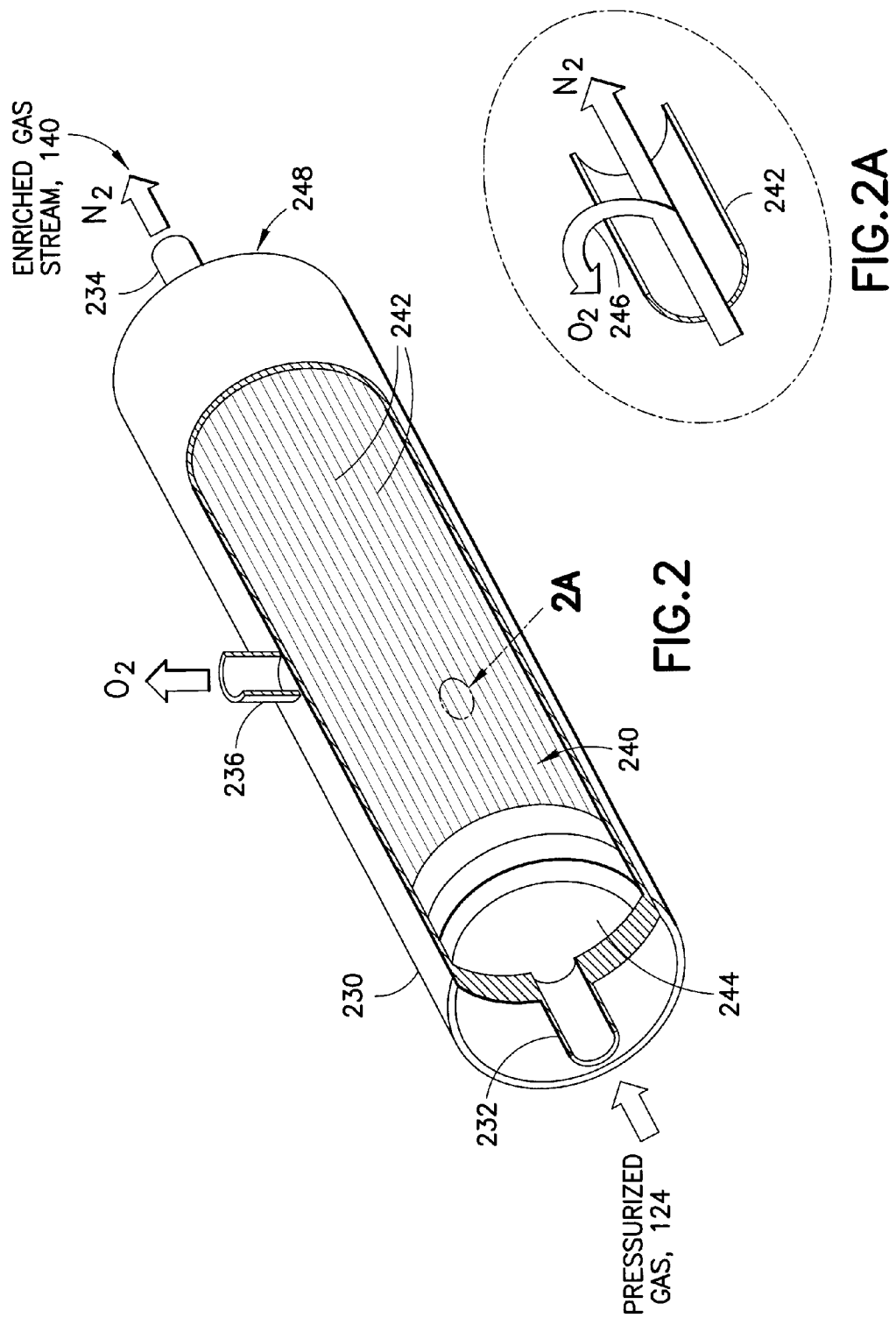

PROCESS AND APPARATUS FOR PROVIDING AN INERT GAS TO A LARGE VOLUME ATMOSPHERE

CROSS-REFERENCE TO RELATED APPLICATION

This application claims the benefit of U.S. provisional application No. 61/099,974, filed Sep. 25, 2008 which is hereby incorporated herein by reference, in its entirety.

FIELD OF THE INVENTION

The present invention relates generally to a process and apparatus for providing an inert gas to a large volume atmosphere and, more particularly, to a process and apparatus for reducing a concentration of ambient air used in a feed stream of a pressure swing adsorption system that provides the inert gas to the large volume atmosphere.

BACKGROUND OF THE INVENTION

Fires in areas that are partially or totally confined are extremely difficult to extinguish due to a number of factors including, for example, heat buildup, the availability of fuel and the presence of toxic gases, all of which make delivery of fire suppressant material and extinguishing of the fire difficult. Confined areas include, but are not limited to, for example, large furnaces, autoclaves, storage tanks and subsurface structures such as subway and highway tunnels, underground mines and landfills. In coal mine fires, for example, the abundance of fuel in a confined, poorly accessible area practically guarantees that the fire will burn for extremely long periods of time. Historically, many coal mines are abandoned with the onset of a fire because of the great difficulty in extinguishing the fire. One such example is the Jonesville coal mine fire, which started more than 30 years ago and is still burning.

Efforts have been made to prevent fires within such confined areas by introducing an inert gas to displace oxygen within the atmosphere of the confined area to eliminate, or at least substantially diminish, a required fuel source for the fire. The use of an inert gas to prevent combustion is well known. Similarly, it is well known to use a pressure swing adsorption (PSA) system for providing an enriched gas to inert an atmosphere of interest.

As is generally known, a gas mixture may be separated using PSA technology by passing the mixture at an elevated pressure through an adsorbent that is selected in accordance with its capacity to adsorb one or more of the components of the mixture. This selectivity is governed by pore size distribution in the adsorbent and the total pore volume. Accordingly, gas molecules with a kinetic diameter less than or equal to the pore size of the adsorbent are retained, or adsorbed, on the adsorbent while gas molecules of larger diameters pass through the adsorbent. The adsorbent, in effect, sieves the gas according to its molecular size. For example, carbon molecular sieves may be used for the production of enriched nitrogen from air as the carbon molecular sieves have a pore structure with a diameter comparable to the kinetic diameter of oxygen. Accordingly, oxygen is adsorbed by the carbon molecular sieve while nitrogen passes through the sieve.

While PSA systems are known, there are perceived problems with conventional PSA systems and molecular sieve technology such as, for example, low yield of the enriched product gas, requirements for large volumes of sieve materials to provide effective capacity within the absorbent, inefficient regeneration methods for refreshing the absorbent, and the requirement for costly vacuum and air receiver systems to cycle air within the system. Accordingly, the inventors have discovered that use of a PSA system and, in particular, a PSA nitrogen generator for providing an enriched nitrogen gas to inert a large volume atmosphere such as is defined by, for example, a mine, can be optimized to maximize the efficient of the system and achieve the desired effect, while also reducing operating cost. Moreover, the inventors have discovered that an improved PSA nitrogen generator is an effective tool for preventing fires within confined areas such as, for example, mines

SUMMARY OF THE INVENTION

The present invention resides in one aspect in a method for reducing a concentration of ambient air used in a feed stream to form an inerting gas in a pressure swing adsorption system. The method includes introducing ambient air into a pressure swing adsorption system to form an inerting gas, introducing the inerting gas to a large volume of atmosphere, thereby inerting at least a portion of the large volume of atmosphere to form an inerted atmosphere, and removing a portion of the inerted atmosphere and introducing the portion of inerted atmosphere to the pressure swing adsorption system to form the inerting gas, thereby reducing an amount of ambient air utilized to form the inerting gas in the pressure swing adsorption system. The ambient air comprises a readily adsorbable component gas and a less readily adsorbable component gas, and the inerting gas comprises the less readily adsorbable component gas. In one embodiment, the less readily adsorbable component gas comprises nitrogen. In one embodiment, the large volume of atmosphere is defined by an interior of at least one of a mine, a tunnel, a furnace, an autoclave, a storage tank and a subsurface portion of a landfill, and the inerted atmosphere prevents combustion within the interior.

Another aspect of the invention resides in a system for reducing an amount of ambient air utilized to form an inerting gas in a pressure swing adsorption system. The system includes at least one pressure swing adsorption system adapted to form an inerting gas from ambient air, a large volume of atmosphere in fluid communication with the pressure swing adsorption system, a conduit for introducing the inerting gas to the large volume of atmosphere to form an inerted atmosphere, and a feedback loop for introducing at least a portion of the inerted atmosphere to the pressure swing adsorption system to reduce an amount of ambient air utilized to form the inerting gas in the pressure swing adsorption system. In one embodiment, in the system the ambient air comprises a more readily adsorbable component gas and a less readily adsorbable component gas, and the inerting gas comprises the less readily adsorbable component gas. In one embodiment, the less readily adsorbable component gas comprises nitrogen. In one embodiment, the large volume of atmosphere is defined by an interior of at least one of a mine, a tunnel, a furnace, an autoclave, a storage tank and a subsurface portion of a landfill, and the inerting gas provides means for preventing combustion within the interior. In yet another embodiment, the pressure swing adsorption system includes at least two adsorbent beds. In the two bed embodiment, a second bed is utilized to provide the inerting gas when a first bed reaches it cycle time and is depressurized so as to cleanse an adsorbent material contained in the first bed such that the inerting gas stream is outputted to continually service the large volume atmosphere of interest during cleansing of adsorption system.

BRIEF DESCRIPTION OF THE DRAWINGS

FIGS. 2 and 2A illustrate use of nitrogen membrane technology within the inert gas generating system of FIG. 1, in accordance with one embodiment of the present invention.

In these figures like structures are assigned like reference numerals, but may not be referenced in the description of all figures

DETAILED DESCRIPTION OF PREFERRED EMBODIMENTS

Figure 1:
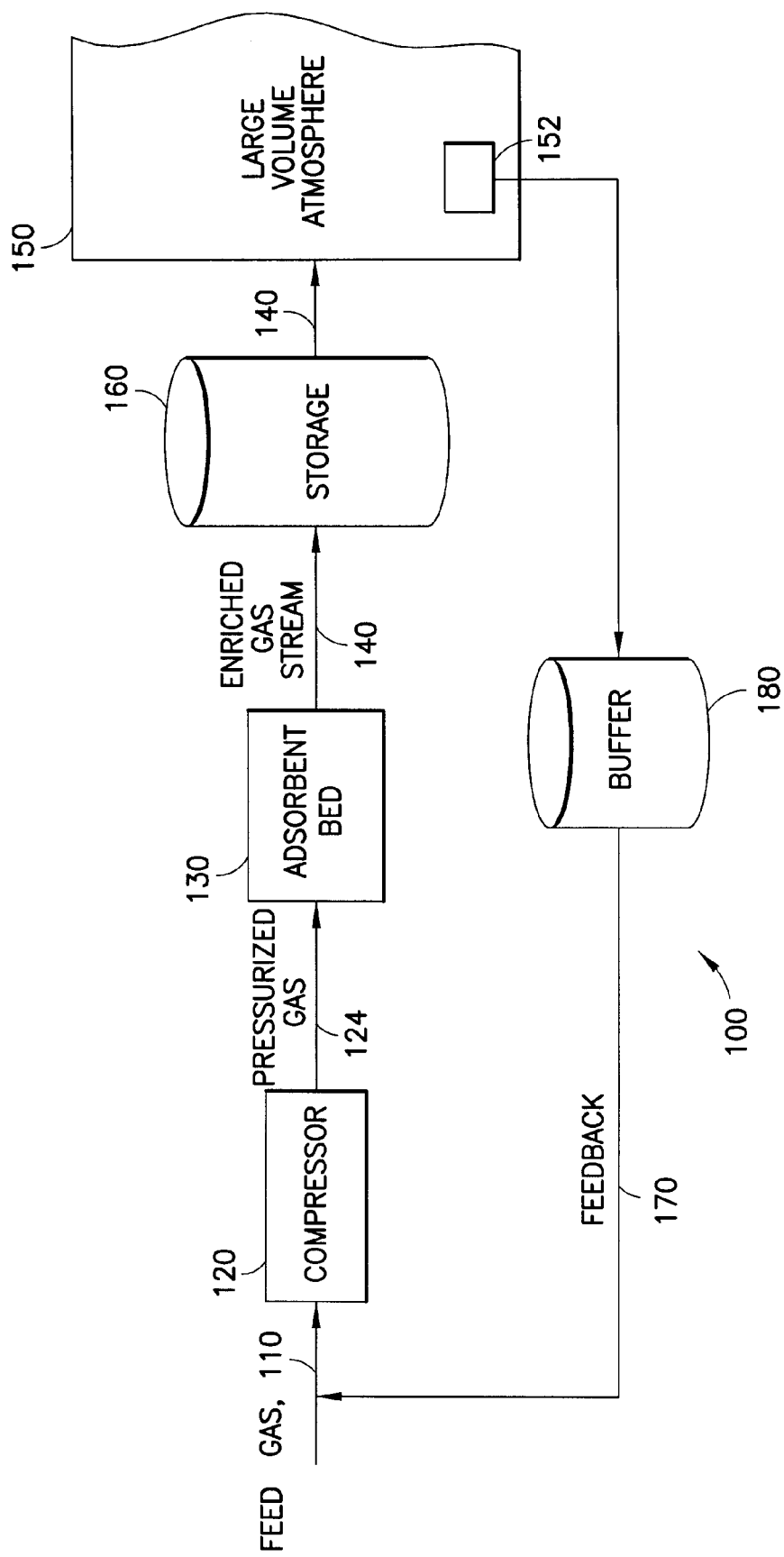
FIG. 1 and FIG. 1A are simplified block diagrams of a pressure swing adsorption system that generates and provides an inert gas to a large volume atmosphere, in accordance with one embodiment of the present invention.

The present invention provides a novel system and method for providing an enriched gas stream to inert a large volume atmosphere. In accordance with one embodiment of the present invention, a pressure swing adsorption (PSA) nitrogen generating system 100 provides an enriched nitrogen ($N_2$) gas stream 140 to inert an atmosphere of interest 150. As shown in FIG. 1, a feed gas mixture 110 is passed through an air compressor 120 where it is pressurized to a predetermined adsorption pressure (e.g., a pressure in a range from about 120 psig to 140 psig) and passed under pressure (e.g., as pressurized gas 124) to an adsorbent bed 130. The feed gas mixture 110 includes a gas having a more readily adsorbable component and a less readily adsorbable component. The adsorbent bed 130 selectively adsorbs the more readily adsorbable component from the pressurized gas 124. In one embodiment, the more readily adsorbable component is oxygen, the less readily adsorbable component is nitrogen, and adsorbent bed 130 includes carbon molecular sieves for adsorbing the oxygen molecules and passing the nitrogen molecules therethrough.

After a predetermined cycle time, the nitrogen gas passed by the sieve material of the adsorbent bed 130 is provided as the enriched nitrogen gas stream 140 to inert the atmosphere of interest 150. In one embodiment, the cycle time is based upon oxygen saturation of the adsorbent bed 130. In one embodiment, the atmosphere of interest 150 includes a large volume atmosphere defined by, for example, an interior portion of a mine, a tunnel, a furnace, an autoclave, a storage tank, a subsurface portion of a landfill and the like, and the nitrogen gas stream 140 is provided to inert the large volume atmosphere to, for example, substantially remove oxygen therein to prevent and/or suppress combustion (e.g., a fire) or a subsequent flare up after a fire is thought to have been extinguished. As can be appreciated, the PSA nitrogen generating system 100 is also employed to maintain a relatively dry, oxygen-free atmosphere within the large volume atmosphere to prevent or minimize oxidizing effects as well as to improved cure times for resins and the like.

Moreover, while described above as a PSA system, it should be appreciated that in one embodiment nitrogen membrane technology may be employed such that the adsorbent bed 130 is replaced by a container 230 (FIG. 2) having an inlet 232 and an outlet 234, and including permeable membrane 240 disposed therein. In one embodiment, the permeable membrane 240 is comprised of a plurality of hollow fibers 242. The pressurized gas 124 (e.g., compressed air) enters the container 230 at the inlet 232 and is passed to a first end 244 of the permeable membrane 240 (e.g., each of the plurality of hollow fibers 242). As shown in a detailed portion of FIG. 2 labeled Detail 2A, which is an enlarged partial cross sectional view of a portion of a hollow fiber, oxygen ($O_2$) and other components (e.g. carbon monoxide (CO), carbon dioxide ($CO_2$), and the like) pass through holes 246 in a wall of the fibers 242 and exit the pressurized gas 124 stream at, for example, a secondary outlet 236. The nitrogen $N_2$ in the pressurized gas 124 travels a length of the hollow fibers, and exits at a second end 248 of the membrane, opposite from the first end 244. The second end 248 of the membrane is disposed in proximity to the outlet 234 so that the nitrogen $N_2$ is passed as the enriched gas stream 140. As shown in FIG. 2, the oxygen $O_2$ in the pressurized gas 124 passes through sidewalls of the hollow fibers and exits through sides of the membrane apart from the enriched gas stream 140. In one embodiment, a pressurized gas 124 is heated in the permeable membrane 240 to excite the molecules and increase, for example, a rate in which the oxygen and other components permeate out through the holes 246. In one embodiment, hollow fibers may be purchased from UBE America Inc., Air Products and Chemicals, Inc., or GENERON® brand membranes sold by Generon IGS, Inc. (GENERON is a registered trademark of Generon IGS, Inc.).

Referring again to FIG. 1, once the enriched gas stream 140 is drawn off, the adsorbent bed 130 is depressurized to a predetermined desorption pressure (e.g., typically ambient pressure) such that the more readily adsorbable component may be removed from the adsorbent bed 130 to cleanse the adsorbent bed 130 for a next cycle. In one embodiment, illustrated in FIG. 1, the enriched nitrogen gas stream 140 drawn off from the adsorbent bed 130 is passed to a surge or storage tank 160 prior to use in the desired application, such as is described above to inert the large volume atmosphere 150.

Figure 1A:
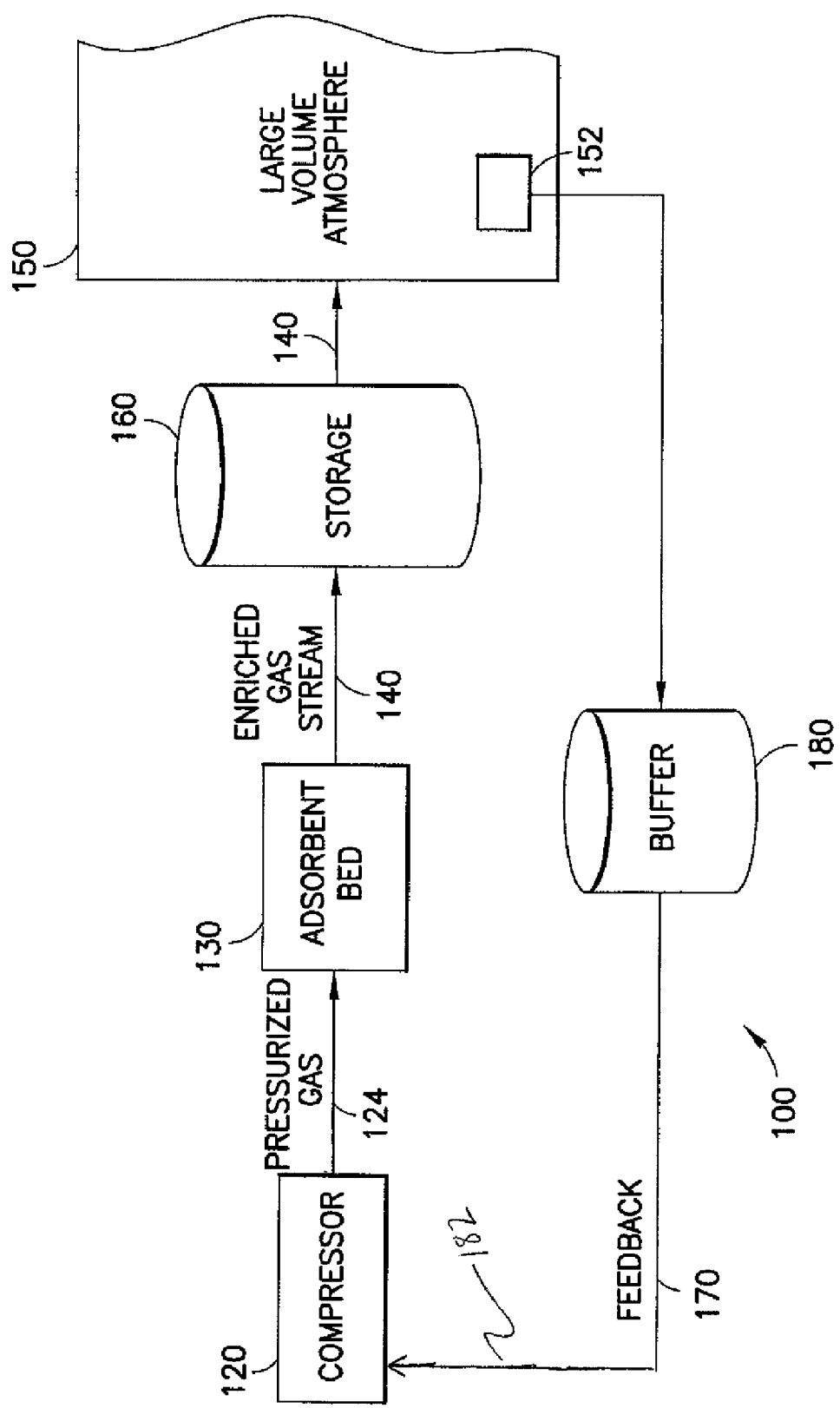

In accordance with one aspect of the present invention, a feedback loop 170 is employed to draw a portion 152 of atmosphere within the atmosphere of interest 150 back into the feed stream 110 of the PSA system 100. As shown in FIG. 1, the portion of atmosphere 152 passed through the feedback loop 170 is provided at the intake of the air compressor 120 to form or mix with the feed gas mixture 110. It should be appreciated that by using at least a portion of the atmosphere of interest 150 in the feed stream 110 of the PSA system 100, oxygen saturation of the adsorbent bed 130 is reduced proportionally to the reduced oxygen content of the atmosphere of interest 150. As such, the cycle time of the PSA system 100 is increased as oxygen saturation time of the adsorbent bed 130 is extended. By extending the saturation time, and ultimately the process cycle time, work required to refresh the adsorbent bed 130 between cycles is reduced providing a cost savings for inerting an atmosphere of interest and/or maintaining an atmosphere at a target purity. It should also be appreciated that when a combination (e.g., mix) of ambient air and the portion 152 of the atmosphere of interest 150 are provided at the intake of the compressor 120, it is desirable to minimize a concentration of the ambient air to realize more of the aforementioned extending effects of a feed stream having reduced oxygen content. In one embodiment, illustrated in FIG. 1, a buffer 180 (e.g., a storage tank) is disposed in the feedback loop 170. The buffer 180 is fed by the large volume atmosphere 150. Accordingly, the feed gas 110 is drawn from the buffer 180 and not directly from the large volume atmosphere 150. In this way, the inerting process may begin with a higher purity feed gas. Also, and as shown in FIG. 1A, in one embodiment it is contemplated that the feed stream (182) provided to the compressor 120 may be portion 152 of the atmosphere of interest 150 that is stored in the buffer 180.

That is, it is contemplated that a portion of the inerted atmosphere may be introduced to the pressure swing adsorption system 100 without introducing ambient air to the pressure swing adsorption system.

Figure 3:
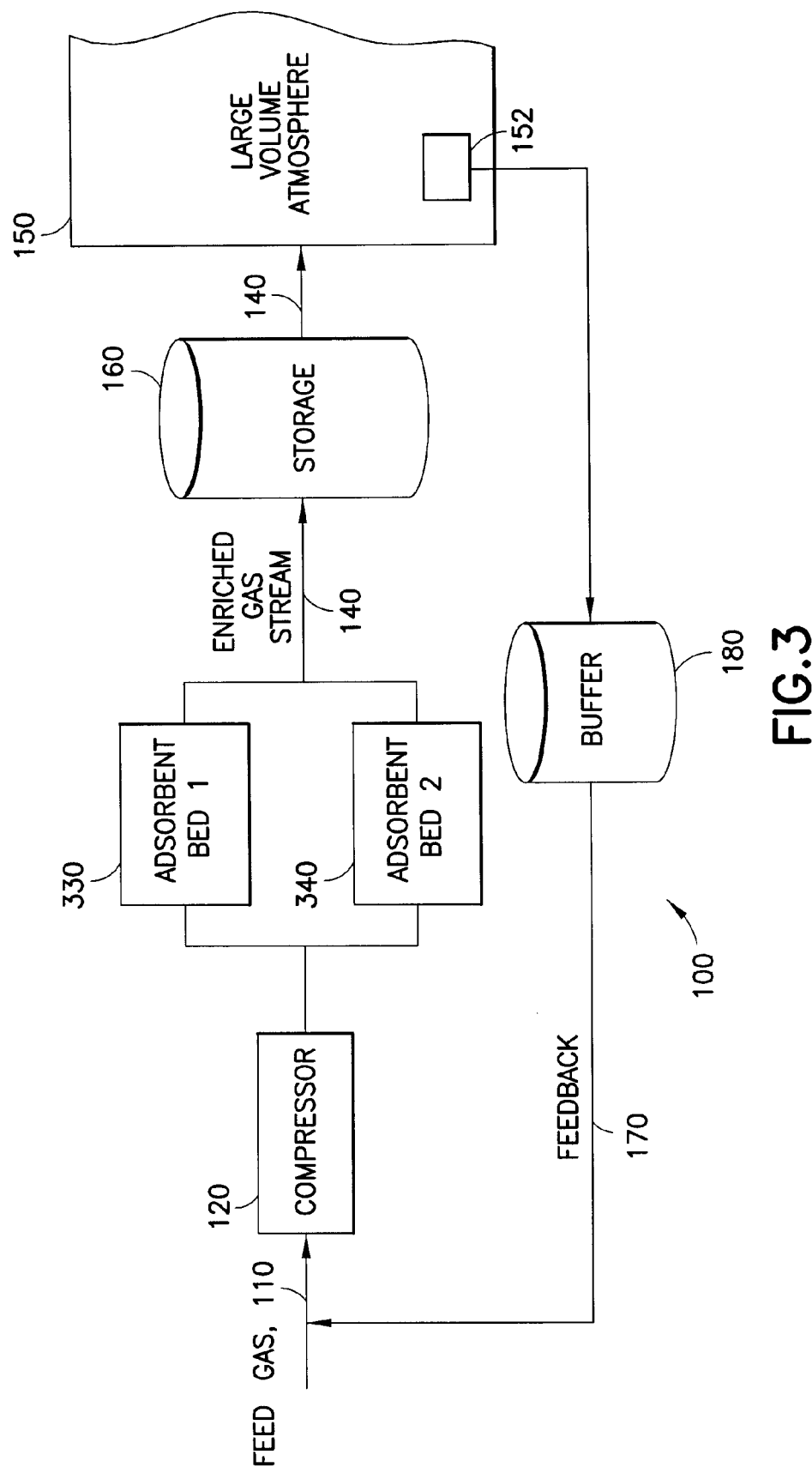
FIG. 3 illustrates use of two adsorption beds within the inert gas generating system of FIG. 1, in accordance with one embodiment of the present invention.

In accordance with one embodiment of the present invention illustrated in FIG. 3, two adsorbent beds 330 and 340 (substantially similar to adsorbent bed 130) are utilized. In this two adsorbent bed embodiment, a second bed (e.g., bed 340) is utilized to provide the enriched gas stream 140 when a first bed (e.g., bed 330) reaches it cycle time and is depressurized so as to cleanse the adsorbent material contained in the first bed. In this two bed embodiment, the enriched nitrogen gas stream 140 outputted by the PSA system 100 continually services the large volume atmosphere of interest 150 even during the cleansing process.

It should be understood that the present invention is not limited with regard to the number of adsorbent beds employed within the PSA system, nor the size of the large volume atmosphere receiving the enriched gas stream outputted by the novel PSA configuration. Accordingly, although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A method for reducing a concentration of ambient air used in a feed stream to form an inerting gas in a pressure swing adsorption system, the method comprising:
   introducing ambient air into a pressure swing adsorption system to form an inerting gas;
   storing at least a portion of the inerting gas in a storage vessel;
   introducing at least a portion of the stored inerting gas to a volume of atmosphere, thereby inerting at least a portion of the volume of atmosphere to form an inerted atmosphere;
   removing a portion of the inerted atmosphere and storing the portion of the inerted atmosphere in a storage vessel; and
   introducing at least a portion of the stored inerted atmosphere to the pressure swing adsorption system to form the inerting gas, thereby reducing an amount of ambient air utilized to form the inerting gas in the pressure swing adsorption system.

2. A method according to claim 1, wherein the ambient air comprises a readily adsorbable component gas and a less readily adsorbable component gas.

3. A method according to claim 2, wherein the inerting gas comprises the less readily adsorbable component gas.

4. A method according to claim 3, wherein the less readily adsorbable component gas comprises nitrogen.

5. A method according to claim 1, wherein the volume of atmosphere is defined by an interior of at least one of a mine, a tunnel, a furnace, an autoclave, a storage tank and a subsurface portion of a landfill.

6. A method according to claim 5, wherein the inerted atmosphere prevents combustion within the interior.

7. A method according to claim 1, further comprising:
   adsorbing a readily adsorbable component gas present in the ambient air on an adsorbent bed located within the pressure swing adsorption system after the ambient air is introduced to the pressure swing adsorption system; and
   releasing the less readily adsorbable component gas from the adsorbent bed to form the inerting gas.

8. A method according to claim 7, wherein after releasing the less readily adsorbable component gas from the adsorbent bed, selectively changing a pressure in the pressure swing adsorption system to depressurize the adsorbent to permit release of the more readily adsorbable component gas for cleansing the adsorbent bed.

9. A method according to claim 1, wherein the portion of the inerted atmosphere is introduced to the pressure swing adsorption system in conjunction with the ambient air.

10. A method according to claim 1, wherein the portion of the inerted atmosphere is introduced to the pressure swing adsorption system without introducing the ambient air to the pressure swing adsorption system.

11. A system for reducing an amount of ambient air utilized to form an inerting gas in a pressure swing adsorption system, the system comprising:
   at least one pressure swing adsorption system adapted to form an inerting gas from ambient air;
   a storage vessel for storing at least a portion of the inerting gas;
   a volume of atmosphere in fluid communication with the pressure swing adsorption system;
   a conduit for introducing the inerting gas to the volume of atmosphere to form an inerted atmosphere; and
   a feedback loop for introducing at least a portion of the inerted atmosphere to the pressure swing adsorption system to reduce an amount of ambient air utilized to form the inerting gas in the pressure swing adsorption system, the feedback loop having a storage vessel disposed therein for storage of at least a portion of the inerted atmosphere prior to introduction to the pressure swing adsorption system.

12. A system according to claim 11, wherein the ambient air comprises a more readily adsorbable component gas and a less readily adsorbable component gas.

13. A system according to claim 12, wherein the inerting gas comprises the less readily adsorbable component gas.

14. A system according to claim 13, wherein the less readily adsorbable component gas comprises nitrogen.

15. A system according to claim 11, wherein the volume of atmosphere is defined by an interior of at least one of a mine, a tunnel, a furnace, an autoclave, a storage tank and a subsurface portion of a landfill.

16. A system according to claim 15, wherein the inerting gas provides means for preventing combustion.

17. A system according to claim 11, wherein the pressure swing adsorption system comprises at least two adsorbent beds.

18. A system according to claim 17, wherein the at least two adsorbent beds are adapted to adsorb a readily adsorbable component gas present in the ambient air and pass a less readily adsorbent component gas present in the ambient air.

19. A system according to claim 18, wherein the less readily adsorbable component gas comprises nitrogen.

20. A system according to claim 11, wherein the portion of the inerted atmosphere is introduced to the pressure swing adsorption system in conjunction with the ambient air.

21. A system according to claim 11, wherein the portion of the inerted atmosphere is introduced to the pressure swing adsorption system without the ambient air.

22. A method for recycling an inerting gas used to inert a volume of atmosphere, the method comprising:
   introducing ambient air to an adsorbent bed to adsorb a more readily adsorbable component gas present in the ambient air and to pass a less readily adsorbable component gas present in the ambient air;
   releasing the less readily adsorbable component gas from the adsorption bed to form an inerting gas;
   storing at least a portion of the interting gas in a storage vessel;
   introducing at least a portion of the stored inerting gas to a volume of atmosphere, thereby inerting at least a portion of the atmosphere;
   removing a portion of inerted atmosphere and storing the portion of the inerted atmosphere in a storage vessel; and
   introducing at least a portion of the stored inerted atmosphere comprising the inerting gas to the adsorbent bed, thereby recycling the inerting gas.

23. A method according to claim 22, further comprising:
   releasing the more readily adsorbable component gas from the adsorbent bed, wherein releasing the more readily adsorbable component gas comprises changing a pressure of an atmosphere within the adsorbent bed.

24. A method according to claim 22, wherein the portion of inerted atmosphere is introduced to the adsorbent bed in conjunction with the ambient air.

25. A method according to claim 22, wherein the inerted atmosphere is introduced to the adsorbent bed without the ambient air.

* * * * *